US008296256B2

(12) United States Patent
Arbel et al.

(10) Patent No.: US 8,296,256 B2
(45) Date of Patent: Oct. 23, 2012

(54) SAT-BASED SYNTHESIS OF A CLOCK GATING FUNCTION

(75) Inventors: Eli Arbel, Migdal Haemek (IL); Oleg Rokhlenko, Haifa (IL); Karen Yorav, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 500 days.

(21) Appl. No.: 12/579,442

(22) Filed: Oct. 15, 2009

(65) Prior Publication Data

US 2011/0093431 A1    Apr. 21, 2011

(51) Int. Cl.
    *G06N 7/06*    (2006.01)
    *G06F 17/50*   (2006.01)
(52) U.S. Cl. ............................ 706/57; 716/132; 716/133
(58) Field of Classification Search ...................... 706/57
    See application file for complete search history.

(56) References Cited

OTHER PUBLICATIONS

Janković, Dragan et al., Arithmetic Expressions Optimisation Using Dual Polarity Property. Serbian journal of electrical engineering 1 (71-80) [online], Nov. 2003 [retrieved on Apr. 3, 2012]. Retrieved from the Internet< URL:http://en.wikipedia.org/wiki/Boolean_function>.*

* cited by examiner

*Primary Examiner* — Jeffrey A Gaffin
*Assistant Examiner* — Nathan Brown, Jr.
(74) *Attorney, Agent, or Firm* — Ziv Glazberg; G&A Glazburg Applbaum (57) ABSTRACT

Clock gating circuit is determined by transforming a clock gating opportunity function to a non-Boolean function and constraining inputs of the non-Boolean function. The non-Boolean function may be a ternary function. Constraining the inputs may be achieved by introducing control variables and a cardinality constraint associated with their values. The non-Boolean function may be utilized to approximate universal quantification of an input assigned with a non-Boolean value, such as "don't care" value. The non-Boolean function may be utilized to provide an ALL SAT solution of a Boolean function using a SAT solver.

18 Claims, 4 Drawing Sheets

SAT-BASED SYNTHESIS OF A CLOCK GATING FUNCTION

BACKGROUND

The present disclosure relates to satisfiability (SAT) solvers in general, and to utilizing formal methods in chip design and verification in particular.

One of the most challenging tasks in chip design is to reduce power consumption in electronic chip designs. Among the many techniques for power reduction, clock gating is one of the most known and widely used. Clock gating reduces the power consumption by partially disabling portions of the circuitry not required for the operation of the circuitry at a given cycle. A latch of a circuitry consumes power when it receives a clock signal, indicating a new cycle, and re-computes its value. Using clock gating technique, the clock signal to the latch is blocked when the recomputed value of the latch is not required in order for the circuitry to behave according to its designated purpose.

In order to provide for a clock gating function the chip design is inspected for clock gating opportunities. It is preferred that the clock gating function will not violate a timing constraint or consume more power than the power consumption reduced by gating the clock. The timing requirement may stipulate that the logic depth of the generated circuitry should not exceed some constant. To reduce the leakage overhead of a clock gating circuitry, latches with similar functions are grouped together and gated with a single function.

It will be noted that in the present application, latches refer to any form of state storage devices, such as for example flip-flops.

BRIEF SUMMARY OF THE INVENTION

One exemplary embodiment of the disclosed subject matter is A computerized apparatus comprising: a processor; an interface for receiving a Boolean function; a non-Boolean abstraction module configured to determine an abstracted function associated with a Boolean function received by the interface, the abstracted function is defined over a non-Boolean domain, wherein the non-Boolean domain is a three-valued domain; and an input controller module configured to limit a number of inputs of the abstracted function that are assigned a Boolean value, the abstracted function is determined by the non-Boolean abstraction module, wherein the input controller module comprises: a control variable definer for defining a control variable associated with an input of the abstracted function; and a cardinality constraint module for defining a cardinality constraint associated with values of one or more control variables.

Another exemplary embodiment of the disclosed subject matter is a computerized apparatus comprising: a processor; an interface for receiving a Boolean function; a non-Boolean abstraction module configured to determine an abstracted function associated with a Boolean function received by the interface, the abstracted function is defined over a non-Boolean domain; an input controller module configured to limit a number of inputs of the abstracted function that are assigned a Boolean value, the abstracted function is determined by the non-Boolean abstraction module; and an interface to a SAT solver.

Yet another exemplary embodiment of the disclosed subject matter is a computerized apparatus comprising: a processor; an interface for receiving a Boolean function; a non-Boolean abstraction module configured to determine an abstracted function associated with a Boolean function received by the interface, the abstracted function is defined over a non-Boolean domain; an input controller module configured to limit a number of inputs of the abstracted function that are assigned a Boolean value, the abstracted function is determined by the non-Boolean abstraction module; and an assignment size determination unit for determining the constraint on a number of inputs being assigned Boolean values.

Yet another exemplary embodiment of the disclosed subject matter is a computerized apparatus comprising: a processor; an interface for receiving a Boolean function; a non-Boolean abstraction module configured to determine an abstracted function associated with a Boolean function received by the interface, the abstracted function is defined over a non-Boolean domain; an input controller module configured to limit a number of inputs of the abstracted function that are assigned a Boolean value, the abstracted function is determined by the non-Boolean abstraction module; and an assignment reduction module configured to transform a first function to a second function, the first function has a first satisfactory assignment and a second satisfactory assignment, the second function has the first satisfactory assignment.

Yet another exemplary embodiment of the disclosed subject matter is a method comprising: obtaining a Boolean function; constructing an abstracted function associated with the Boolean function, the abstracted function is defined over a non-Boolean domain; adding a limitation on a number of inputs of the abstracted function which are assigned a Boolean value, the adding the limitation is performed using a processor, the limitation comprising: defining a control variable associated with an input; and defining a cardinality constraint over a value of one or more control variables; whereby the Boolean function is transformed to the abstracted function, the abstracted function is configured to be satisfied by a partial assignment; and utilizing a SAT solver to determine a partial assignment that satisfies the abstracted function.

Yet another exemplary embodiment of the disclosed subject matter is a method comprising: obtaining a Boolean function; constructing an abstracted function associated with the Boolean function, the abstracted function is defined over a non-Boolean domain; adding a limitation on a number of inputs of the abstracted function which are assigned a Boolean value, the adding the limitation is performed using a processor, the limitation comprising: defining a control variable associated with an input; and defining a cardinality constraint over a value of one or more control variables; wherein the adding the limitation on the number of inputs of the abstracted function is performed iteratively, in a first iteration a first cardinality constraint is defined and in a second iteration a second cardinality constraint is defined; and whereby the Boolean function is transformed to the abstracted function, the abstracted function is configured to be satisfied by a partial assignment.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

The disclosed subject matter is described below with reference to flowchart illustrations and/or block diagrams of methods, apparatus (systems) and computer program products according to embodiments of the subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create a device for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is to determine a clock gating opportunity that may be utilized in clock gating. Another technical problem dealt with by the disclosed subject matter is to determine a set of satisfactory assignments of a Boolean function. Yet another problem dealt with by the disclosed subject matter is to provide a method to determine the clock gating opportunities which are correct-by-construction. Yet another problem dealt with by the disclosed subject matter is to provide determination of clock gating opportunities that scales well to large designs.

One technical solution is to transform a Boolean function, which may represent the clock gating opportunities, to a ternary function. Control variables may be introduced to the ternary function to control the number of inputs of the ternary function having a Boolean value. The control variables may be associated with a nondeterministic value. A constraint over the control variables may be utilized to limit the number of inputs of the ternary function having a Boolean value. Another technical solution is to utilize a SAT solver to determine a satisfactory assignment of the ternary function. Yet another technical solution is to utilize the control variables to enforce a limit on a size of a partial satisfactory assignment determined by the SAT solver. Yet another technical solution is to iteratively utilize a SAT solver and modify the ternary function to not be satisfied by a satisfactory assignment determined by the SAT solver.

One technical effect of utilizing the disclosed subject matter is to provide a partial satisfactory assignment of a Boolean function. Another technical effect of utilizing the disclosed subject matter is to provide all satisfactory assignments of a Boolean function, grouping several satisfactory assignments together as one partial satisfactory assignment. Yet another technical effect is to utilize the ternary function to perform an approximation of a universal quantification using a SAT solver. Yet another technical effect is providing a configurable amount of abstraction by controlling a number of injected non-Boolean values as inputs to the ternary function. Yet another technical effect is to utilize a SAT solver to determine a partial satisfying assignment.

Figure 1:
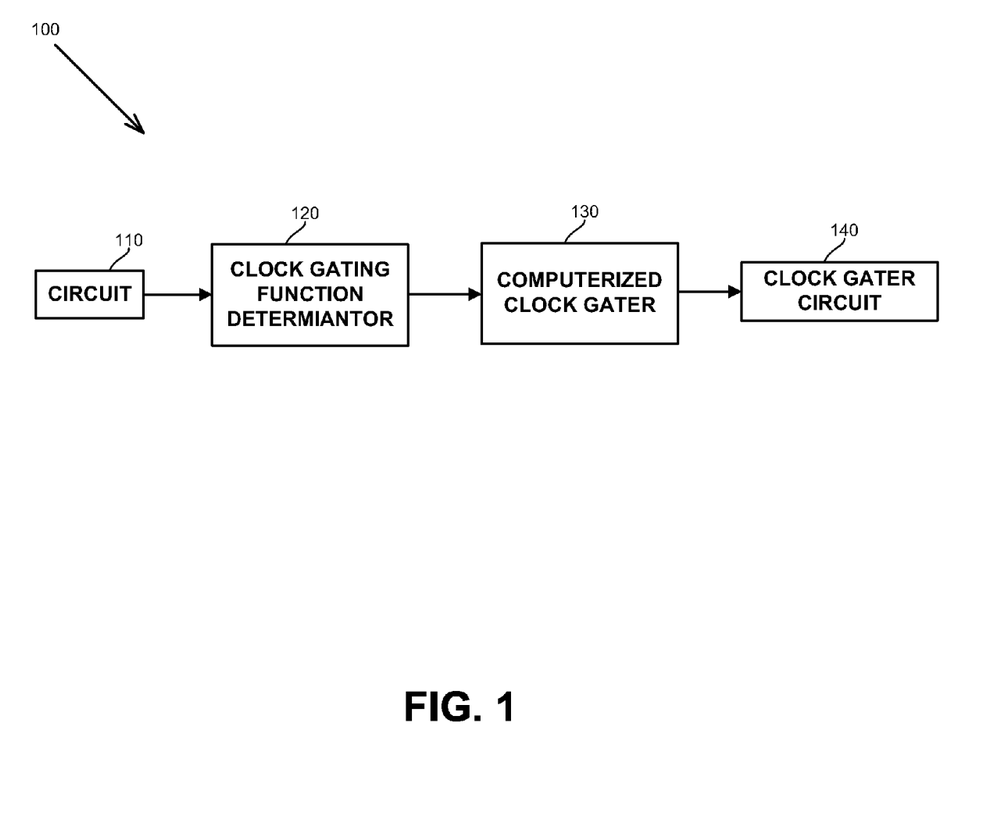
FIG. 1 shows a computerized environment in which the disclosed subject matter is used, in accordance with some exemplary embodiments of the subject matter.

Referring now to FIG. 1 showing a computerized environment in which the disclosed subject matter is used, in accordance with some exemplary embodiments of the subject matter. A computerized environment 100 comprises a clock gating function determinator 120 and a computerized clock gater 130. The clock gating function determinator 120 may be configured to receive or otherwise obtain a circuit 110. The clock gating function determinator 120 may determine a clock gating function (not shown) representing clock gating opportunities associated with the circuit 110. The clock gating function determinator 120 may be a computerized device configured to automatically determine the clock gating function. The clock gating function determinator 120 may be a person such as an engineer that is responsible for manually determining the clock gating function. In some exemplary embodiment, the clock gating function determinator 120 may utilize methods such as feedback loop elimination, unobservability don't cares or the like.

In some exemplary embodiments, the circuit 110 may be defined using a descriptive language such as VHDL, Verilog, SystemC, System Verilog, PSL, EDL or the like.

In some exemplary embodiments, the computerized clock gater 130 may be configured to determine a clock gater circuit 140 based upon the clock gating function. The clock gater circuit 140 may be configured to block a clock signal to a clock of the circuit 110 depending on a state of the circuit 110. The clock signal may be blocked in a state of the circuit 110 in which the clock gating function is evaluated to ONE or a different predetermined number.

In some exemplary embodiments, the clock gating function determinator 120 may determine a clock gating function associated with a portion of the circuit 110, such as for example a latch or a set of latches. The computerized clock gater 130 may determine a clock gater circuit 140 associated with the portion of the circuit 110. In some exemplary embodiments, the disclosed subject matter may be utilized iteratively to provide several clock gater circuits, such as 140, each associated with a possibly different portion of the circuit 110.

Figure 2:
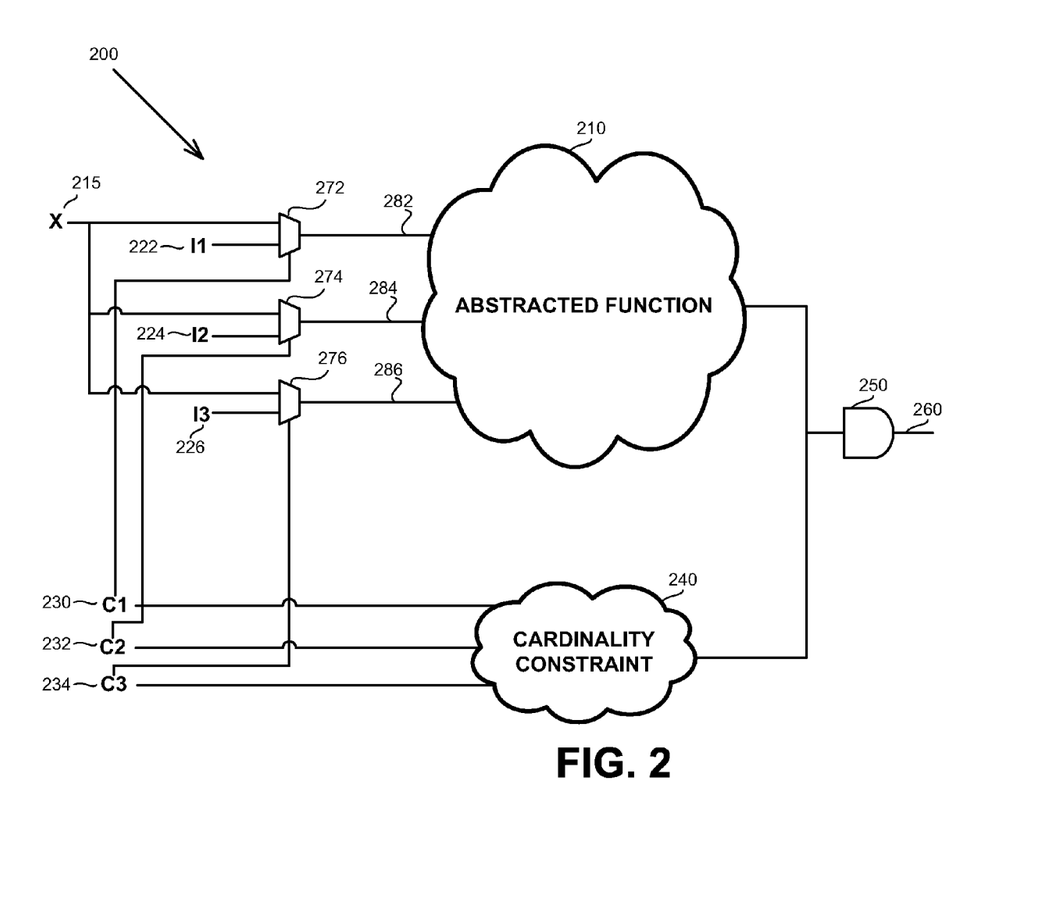
FIG. 2 shows a diagram of a function, in accordance with some exemplary embodiments of the subject matter.

Referring now to FIG. 2 showing a diagram of a function, in accordance with some exemplary embodiments of the subject matter. A function 200 may comprise an abstracted function 210.

In some exemplary embodiments, the abstracted function 210 may be a non-Boolean abstraction of a Boolean clock gating function, such as determined by a clock gating function determinator 120 of FIG. 1. The abstracted function 210 may be configured to receive either a Boolean input (i.e., ZERO or ONE) or a non-Boolean input. The non-Boolean input may be utilized to abstract a set of Boolean values. For example, in case the abstracted function 210 is a ternary function, the abstracted function 210 may be defined over {ZERO, ONE, X} where X represents an "unknown" value. An "unknown" value may be considered as possibly both ZERO and ONE. Operators may be defined over the non-Boolean domain, such as for example an output of the conjunction operator may be defined as ZERO in case a ZERO is conjuncted with any value, a ONE in case a ONE is conjuncted with ONE, or an X in case an X is conjuncted with either a ONE or an X. In other exemplary embodiments, other non-Boolean domains may be employed to abstract the Boolean function.

It will be noted that in a ternary domain, also referred to as a three-valued domain, in case a ternary function is provided with an X value as an input, and the function evaluates to ONE (i.e., TRUE), any value the input may receive does not affect the value of the function. For example, the function evaluates to ONE if the input receives the value ONE or the value ZERO. The function evaluates to ONE based on other inputs. Therefore, the abstracted function which is given an X value to an input, may be considered as approximation to determining a second function by universally quantifying the input.

In an exemplary embodiment, the abstracted function 210 is provided with three inputs 282, 284, 286. The input 282 may have an I1 222, or an X value 215. The I1 222 value may be a nondeterministic value defined over a Boolean domain. The I1 222 value may be nondeterministically chosen from the Boolean domain, so that it may be either ZERO or ONE.

In an exemplary embodiment, a multiplexer 272 is utilized to determine whether the input 282 may receive the X value 215 or the I1 222 value. The multiplexer 272 may be configured to provide the X value 215 in case a control variable C1 230 has a first value. The multiplexer 272 may be configured to provide the I1 222 value in case the control variable C1 230 has a second value. The control variable C1 230 may have a value of either ZERO or ONE that is nondeterministically chosen or otherwise determined.

In some exemplary embodiments, other inputs such as the inputs 284 and 286 may have other associated multiplexers such as 274 and 276 which select between a nondeterministic value such as I2 224 and I3 226, and between the X value 215. The other associated multiplexers 274 and 276 may be associated with other control variables such as C2 232 and C3 234.

In some exemplary embodiments, a cardinality constraint 240 may be utilized to enforce a limitation on the control variables, such as C1 230, C2 232 and C3 234. For example, the cardinality constraint 240 may require that a sum of the control variables C1 230, C2 232 and C3 234 may be at most a predetermined number, such as for example two. In some exemplary embodiments, a ZERO value of a control variable, such as C1 230, induces an associated input, such as 282, to be assigned with a Boolean value. The cardinality constraint 240 may limit a number of inputs that are assigned with a Boolean value, by limiting a number of control variables having a ONE value. For example, by limiting a summation of the control variables C1 230, C2 232, C3 234 to be at most two, at most two control variables are assigned a ONE value and therefore at most two inputs of the abstracted function 210 are assigned a Boolean value. The other inputs may be assigned with the X value 215.

In some exemplary embodiments, utilizing the cardinality constraint 240 and allowing the control variables C1 230, C2 232, C3 234 to be assigned each with a nondeterministic value, enables an automatic solver, such as a SAT solver, a theorem prover, a CSP solver or the like, to automatically select which inputs will be assigned the X value 215 and which will be assigned with a Boolean value.

In some exemplary embodiment, the function 200 comprises a conjunction gate 250, such as an AND gate. The conjunction gate 250 may be configured to conjunct an output value of the abstracted function 210 and an output value of the cardinality constraint 240. An output 260 of the function 200 may be indicative that the abstracted function 210 is satisfied by the inputs 282, 284 and 286 and that the control variables C1 230, C2 232 and C3 234 satisfy the cardinality constraint 240.

In some exemplary embodiments, the cardinality constraint 240 may be configured to limit a number of inputs to the abstracted function 210 that are utilized in satisfying the abstracted function 210. For example, the cardinality constraint 240 may limit the number of inputs to be at most one input, such that any satisfying assignment to the function 200 comprises at most one input of the abstracted function 210 which receives a Boolean value. A satisfying assignment in which a value of one or more inputs is the X value 215 or other non-Boolean value, may be considered a partial satisfying assignment also referred to as a partial satisfactory assignment.

Figure 3:
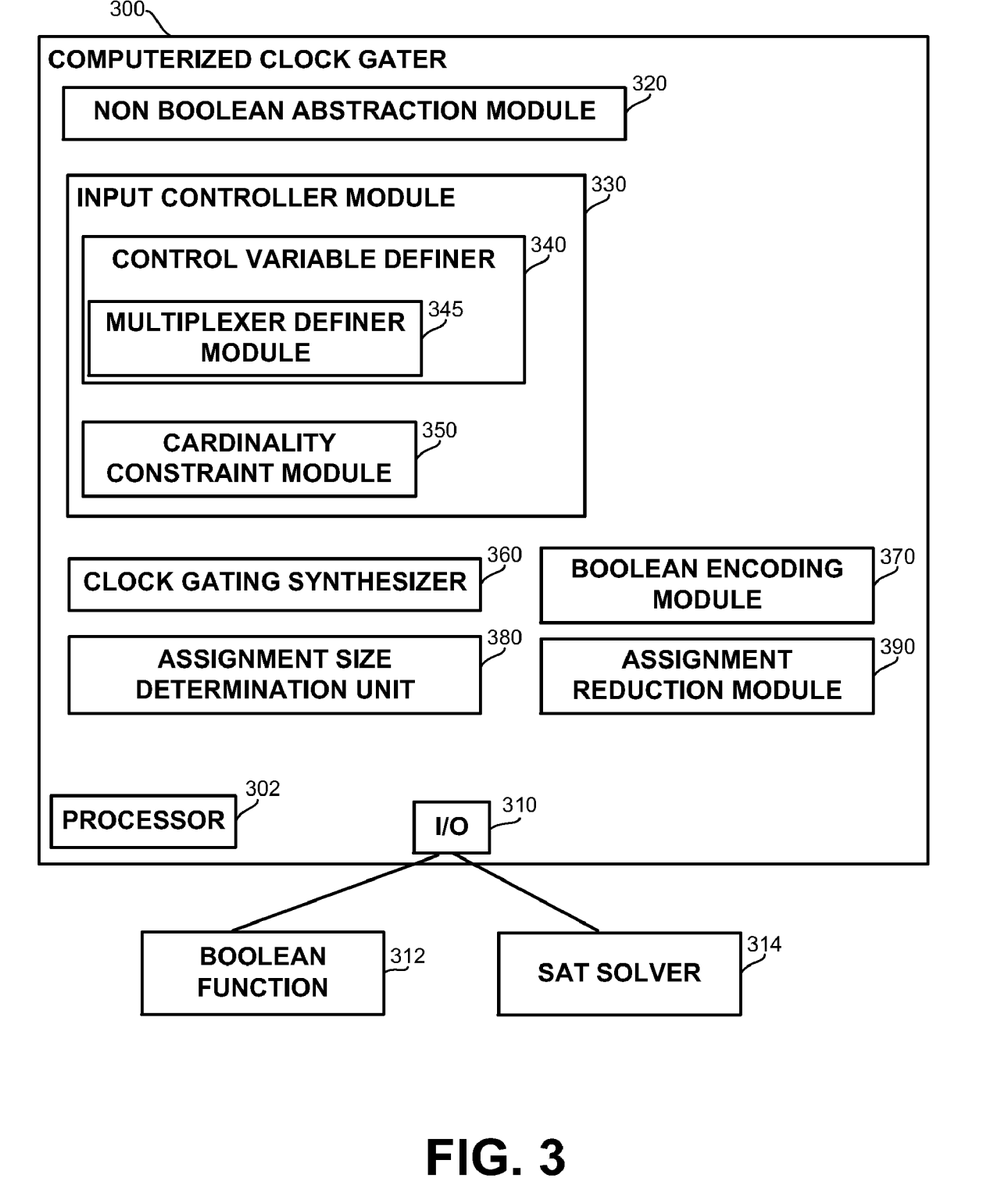
FIG. 3 shows a diagram of a computerized clock gater, in accordance with some exemplary embodiments of the disclosed subject matter.

Referring now to FIG. 3 showing a diagram of a computerized clock gater, in accordance with some exemplary embodiments of the disclosed subject matter. A computerized clock gater 300, such as for example 130 of FIG. 1, may comprise a processor 302. The processor 302 may be a Central Processing Unit (CPU), a microprocessor, an electronic circuit, an Integrated Circuit (IC) or the like. The processor 302 may be utilized to perform computations required by the computerized clock gater 300 or any of it subcomponents.

In some exemplary embodiments, the computerized clock gater 300 may comprise an I/O module 310. The I/O module 310 may be an interface utilized to receive or otherwise obtain a Boolean function 312.

In some exemplary embodiments, the computerized clock gater 300 may comprise a non-Boolean abstraction module 320. The non-Boolean abstraction module 320 may generate or otherwise determine an abstracted function, such as 210 of FIG. 2, in respect to the Boolean function 312. The abstracted function may be a non-Boolean function, such as a ternary function. The Boolean function 312 may be a clock gating function, such as determined by the clock gating function determinator 120 of FIG. 1.

In some exemplary embodiments, the computerized clock gater 300 may comprise an input controller module 330. The input controller module 330 may be configured to limit a number of inputs of the abstracted function that are assigned a Boolean value.

In some exemplary embodiments, the input controller module 330 may comprise a control variable definer 340 for defining or otherwise introducing a control variable, such as 230 of FIG. 2, to control an input of the abstracted function. In some exemplary embodiments, a control variable may control more than one input of the abstracted function.

The control variable definer 340 may comprise a multiplexer definer module 345 that may be configured to define or otherwise introduce to the abstracted function a determination logic, such as for example the multiplexer 272 of FIG. 2. The determination logic may be configured to limit the input of the abstracted function in accordance with a value of an associated control variable. In some exemplary embodiment, a determination logic is a multiplexer configured to output an X value in case the control variable is ZERO and a nondeterministically chosen Boolean value in case the control variable is ONE. An output of the determination logic may be connected to an input of the abstracted function. It will be noted that the determination logic may be a circuitry element, such as a multiplexer, a representation of a circuitry element, such as a VHDL definition, a mathematical representation, such as may be achieved by using an implication operator, or the like.

In some exemplary embodiments, the input controller module 330 may comprise a cardinality constraint module 350. The cardinality constraint module 350 may be configured to define or otherwise introduce to the abstracted function a cardinality constraint, such as 240 of FIG. 2. In some exemplary embodiments, the cardinality constraint may be a circuit which provides a ONE output if and only if a summarization of one or more control variables is less than or equal to a predetermined number. In other exemplary embodiments, the cardinality constraint may be a formula, a logical representation of a circuit or the like. In other exemplary embodiments, other cardinality constraints may be utilized such that an output of the cardinality constraint is indicative of a number of constraint variables having a predetermined value, such as for example ONE or ZERO. A value of a constraint variable may be indicative of an input of the abstracted function having a Boolean value.

In one exemplary embodiment, each control variable is associated with an input of the abstracted function. A control variable has a ONE value only in case the input has a Boolean value. The cardinality constraint may be a constraint that a summarization of the control variables is less than a predetermined number, such as for example five. The cardinality constraint may provide a ONE output only in case at most five (or other predetermined number) of inputs have Boolean values. The rest of the inputs may have a non-Boolean value such as for example an X value. The predetermined number combined with the cardinality constraint may induce a number of inputs in a partial satisfying assignment to the abstracted function. Any input having an X value may be omitted from the partial satisfying assignment.

In some exemplary embodiments, the cardinality constraint module 350 may be utilized to determine more than one cardinality constraint. In some exemplary embodiments, a different cardinality constraint may be determined at different times, such as for example initially starting with a first predetermined number, such as for example ten, and proceeding with a second predetermined number, such as for example five. In some exemplary embodiments, a predetermined number may be iteratively increased in order to first obtain partial satisfying assignments with a minimal number of inputs and later obtain partial satisfying assignments with bigger number of inputs.

In some exemplary embodiments, the computerized clock gater 300 may further comprise an assignment size determination unit 380. The assignment size determination unit 380 may be configured to determine a number of inputs in a partial satisfying assignment. The number of inputs may be utilized by the cardinality constraint module 350. The number of inputs may be determined based on rules, preferences, user input or the like. The number of inputs may be determined based on previously determined number of inputs. In some exemplary embodiments, the number of inputs may not exceed a predetermined number. The predetermined number may be a number of inputs in a satisfying assignment that is not a partial assignment. The predetermined number may be a maximal number of a clock gating circuit. The predetermined number may be higher than the maximal number of a clock gating circuit, such as for example in case a number of inputs in a partial satisfactory assignment may be reduced by utilizing other techniques. In some exemplary embodiments, the predetermined number may be associated with a logic depth that a clock gating circuit should not exceed, such as for example stipulated by a timing requirement, a power consumption requirement or the like.

In some exemplary embodiments, the computerized clock gater 300 may comprise a clock gating synthesizer 360. The clock gating synthesizer 360 may be configured to determine a clock gating function based on a satisfying assignment to the abstracted function. The satisfying assignment may be a partial satisfying assignment, which may be considered as representing a set of non-partial satisfying assignment. A satisfying assignment may be associated with one or more states of a circuit, such as 110 of FIG. 1. The clock gating synthesizer 360 may be configured to synthesize a circuitry or a descriptive definition thereof, such as for example using VHDL, such that the circuitry may gate a clock signal to a one or more latch or other element receptive to clock signals. The gating function may be evaluated to ONE in case a state of the circuit, such as 110 of FIG. 1, is not affected by a blocking of the clock signal. It will be noted that the circuitry may be considered not affected in case a value of the latch is unchanged, in case a design functionality of the circuit is not changed or the like. It will be noted that the disclosed subject matter may be utilized in combinational clock gating, in sequential clock gating and the like.

In some exemplary embodiments, the clock gating synthesizer 360 may create a clock gater circuit, such as 140 of FIG. 1. The clock gater circuit may be associated to the clock gating function.

In some exemplary embodiments, the computerized clock gater 300 comprises a Boolean encoding module 370. The Boolean encoding module 370 may encode a non-Boolean function, such as for example the function 200 of FIG. 2, in a Boolean domain. In some exemplary embodiments, a dual-rail encoding may be utilized to encode a non-Boolean function over the Boolean domain.

In some exemplary embodiments, the computerized clock gater 300 may comprise the I/O module 310. The I/O module 310 may an interface, such as an Application Programming Interface (API) to a SAT solver 314.

In some exemplary embodiments, the SAT solver 314 may be comprised by the computerized clock gater 300. The SAT solver 314 may be a third-party SAT solver. The SAT solver 314 may be configured to provide a satisfying assignment to a Boolean function, such as a Boolean function determined by the Boolean encoding module 370. The SAT solver 314 may be configured to provide a satisfying assignment to a non-Boolean function, such as the function 200 of FIG. 2. The SAT solver 314 may determine a satisfying assignment comprising one or more X values to inputs of a function. The satisfying assignment may be considered as a partial satisfying assignment. The SAT solver 314 may provide an indication that the function is not satisfiable, such as by indicating an UNSAT output.

In some exemplary embodiments, the computerized clock gater 300 comprises an assignment reduction module 390. The assignment reduction module 390 may be configured to transform a first function, such as the function 200 of FIG. 2 or a Boolean representation of such function, to a second function. The second function may be satisfied by the same satisfying assignments as the first function except for an at least one predetermined satisfied assignment. In some exemplary embodiments, the computerized clock gater 300 may utilize the SAT solver 314 to determine a first satisfying assignment to the first function. The computerized clock gater 300 may further utilize the assignment reduction module 390 to transform the first function to a second function such that the first satisfying assignment is excluded from satisfying the second function. The computerized clock gater 300 may further utilize the SAT solver 314 to determine a second satisfying assignment which may be different than the first satisfying assignment.

In some exemplary embodiments, the assignment reduction module 390 may reduce a satisfying assignment by adding to a function, such as 200 of FIG. 2, an element excluding the satisfying assignment, such as for example a comparator element that compares inputs to the satisfying assignment.

It will be noted that the computerized clock gater 300 may utilize the disclosed subject matter using functions instead of circuits. Furthermore, in some exemplary embodiments, the functions may represent computerized devices other than circuitry such as for example software, firmware or the like. In some exemplary embodiments, the functions may be Boolean functions in CNF form. In some exemplary embodiment, the functions may be associated with models utilized in model checking or the like.

Figure 4:
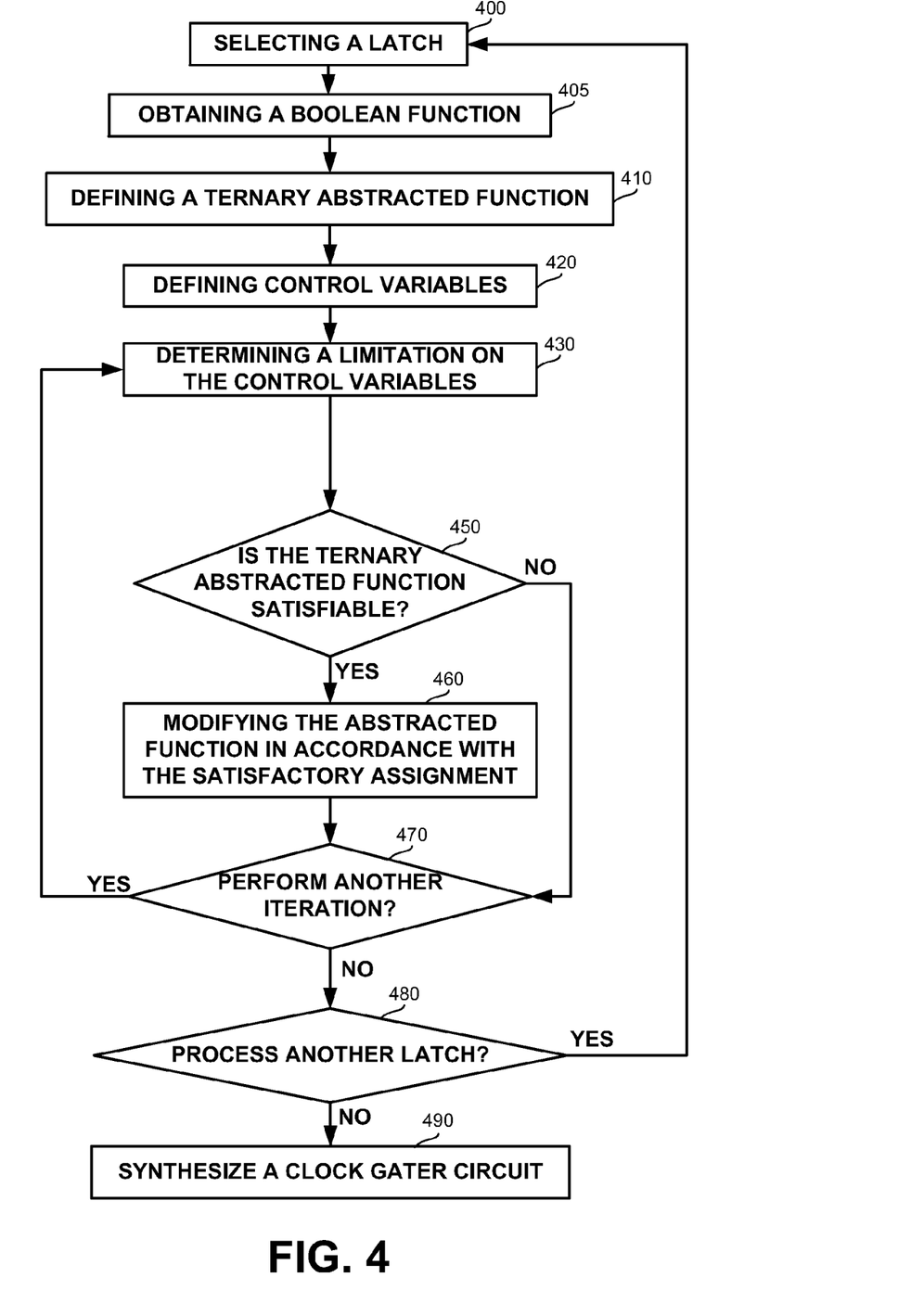
FIG. 4 shows a flowchart of a method, in accordance with some exemplary embodiments of the disclosed subject matter.

Referring now to FIG. 4 showing a flowchart of a method, in accordance with some exemplary embodiments of the disclosed subject matter.

In step 400 a latch may be selected. The latch may be comprised by a circuit, such as 110 of FIG. 1. In some exemplary embodiments, several latches are selected. The selection may be performed by a clock gating function determinator, such as for example 120 of FIG. 1.

In step 405, a Boolean function may be obtained by, for example, an I/O module 310 of FIG. 3. The Boolean function may be a clock gating function. The Boolean function may be determined by a clock gating function determinator, such as for example 120 of FIG. 1.

In step 410 a ternary abstracted function may be defined. In some exemplary embodiments, other non-Boolean abstracted functions may be defined. The ternary abstracted function may be determined by a non-Boolean abstraction module such as 320 of FIG. 3. The ternary function may be determined based upon the Boolean function.

In step 420 one or more control variables may be defined. The control variables may be defined by a control variable definer, such as 340 of FIG. 3. The control variables may be defined with respect to inputs of the ternary function.

In step 430 a limitation on the control variables may be determined. The limitation may be a maximal summation value, a minimal summation value, a possible combination of values to control values, a combination thereof or the like. The limitation may be determined based on preferences, user input, rules, commands or the like. The limitation maybe determined by an assignment size determination unit such as for example 380 of FIG. 3. The limitation may be induced using a cardinality constraint, such as 240 of FIG. 2. The limitation may be determined by a cardinality constraint module, such as 350 of FIG. 3.

In step 450 a determination is made whether the ternary abstracted function, such as 200 of FIG. 2, is satisfiable, given the limitations induced by steps 420 or 430. The determination may be made by a SAT solver, such as 314 of FIG. 3. The determination may be that a module, such as the SAT solver is unable to determine a satisfying assignment, such as for example, due to lack of resources or the like.

In case the ternary abstracted function is satisfiable, step 460 may be performed. In step 460, the ternary abstracted function may be modified to exclude the satisfying assignment determined in step 450. The modification may be performed by an assignment reduction module, such as 390 of FIG. 3.

Step 470 may be performed in case the ternary abstracted function is not satisfiable. Step 470 may be performed in response to performing step 460. In step 470 a determination is made whether to perform another iteration of exemplary method, with respect to the latch selected in step 400. The determination may be based upon some of the following considerations: whether the ternary abstracted function was satisfiable, whether the limitation in step 430 may be relaxed, elapsed time, utilization of resources, resources availability and the like. The determination may be affected by rules, preferences, user input, commands or the like. In case the determination is to perform another iteration, step 430 may be performed. In some cases, in step 430 a same limitation may be determined as before. In some cases, in step 430 a different limitation than before may be determined. In some cases, in response to determining in step 450 that the ternary abstracted function is not satisfiable given a first limitation, in step 430 a second limitation may be determined which may be less restrictive than the second limitation. It will be noted that in some exemplary embodiments, a more restrictive limitation may be determined in step 430 than previously determined.

In case the determination in step 470 is not to perform another iteration, step 480 may be performed. In step 480 a determination may be made whether to utilize the disclosed subject matter on another latch. In case of a positive determination, step 400 is performed. Otherwise, step 490 may be performed. A determination may be affected by elapsed time, utilization of resources, resources availability, a number of latches already processed or the like.

In step 490, a clock gater circuit may be synthesized or otherwise introduced into the circuit, such as 110 of FIG. 1. Step 490 may be performed by a clock gating synthesizer, such as for example 360 of FIG. 3. In some exemplary embodiments, step 490 may be performed in respect to one latch, in respect to a group of latches, in respect to one Boolean function such as obtained in step 405, in respect to a group of Boolean functions or the like.

In some exemplary embodiments, the disclosed subject matter may be utilized to determine all satisfying assignments to a function. The disclosed subject matter may be utilized as an ALL SAT solver. The disclosed subject matter may be utilized to iteratively satisfy an abstracted function, which is associated with the function, with a relatively small partial satisfying assignment, therefore determining a large set of full satisfying assignment of an associated function. By first determining small partial satisfying assignments some calls to the SAT solver may be omitted, as the partial satisfying assignment covers several satisfying assignments. The disclosed subject matter may be utilized to iteratively relax a limitation, such as determined in step 430, until the limitation is omitted.

In some exemplary embodiments, the disclosed subject matter may utilize solver which are not SAT solvers, such as for example a CSP solver, a theorem prover or the like.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computerized apparatus comprising:
    a processor;
    an interface for receiving a Boolean function;
    a non-Boolean abstraction module configured to determine an abstracted function associated with a Boolean function received by said interface, the abstracted function is defined over a non-Boolean domain, wherein the non-Boolean domain is a three-valued domain; and
    an input controller module configured to limit a number of inputs of the abstracted function that are assigned a Boolean value, the abstracted function is determined by said non-Boolean abstraction module,
    wherein said input controller module comprises:
        a control variable definer for defining a control variable associated with an input of the abstracted function; and
        a cardinality constraint module for defining a cardinality constraint associated with values of one or more control variables.

2. The computerized apparatus of claim 1, wherein a value of a one control variable is indicative to the input being assigned a Boolean value.

3. The computerized apparatus of claim 2, wherein the cardinality constraint is a constraint on a sum of the one or more control variables.

4. The computerized apparatus of claim 2 wherein said control variable definer comprises a multiplexer definer module.

5. A computerized apparatus comprising:
    a processor;
    an interface for receiving a Boolean function;
    a non-Boolean abstraction module configured to determine an abstracted function associated with a Boolean function received by said interface, the abstracted function is defined over a non-Boolean domain;
    an input controller module configured to limit a number of inputs of the abstracted function that are assigned a Boolean value, the abstracted function is determined by said non-Boolean abstraction module; and an interface to a SAT solver.

6. The computerized apparatus of claim 5 further comprising
a Boolean encoding module for encoding the abstracted function over a Boolean domain.

7. The computerized apparatus of claim 5 further comprising the SAT solver.

8. The computerized apparatus of claim 5, wherein said SAT solver is an incremental SAT solver.

9. The computerized apparatus of claim 5 further comprising a clock gating synthesizer configured to determine a clock gating function based on one or more satisfying assignments of the abstracted function.

10. The computerized apparatus of claim 5 further comprising an assignment size determination unit for determining the constraint on a number of inputs being assigned Boolean values.

11. The computerized apparatus of claim 5 further comprising an assignment reduction module configured to transform a first function to a second function, the first function has a first satisfactory assignment and a second satisfactory assignment, the second function has the first satisfactory assignment.

12. The computerized apparatus of claim 11, wherein the second satisfactory assignment is a partial assignment.

13. A method comprising:
obtaining a Boolean function;
constructing an abstracted function associated with the Boolean function, the abstracted function is defined over a non-Boolean domain;
adding a limitation on a number of inputs of the abstracted function which are assigned a Boolean value, said adding the limitation is performed using a processor, the limitation comprising:
defining a control variable associated with an input; and
defining a cardinality constraint over a value of one or more control variables;
whereby the Boolean function is transformed to the abstracted function, the abstracted function is configured to be satisfied by a partial assignment; and
utilizing a SAT solver to determine a partial assignment that satisfies the abstracted function.

14. The method of claim 13 further comprises modifying the abstracted function not to be satisfied by the partial assignment.

15. The method of claim 14 wherein said utilizing a SAT solver to determine a partial assignment and said modifying the abstracted function not be satisfied by the partial assignment are performed iteratively.

16. The method of claim 13 further comprises synthesizing a clock gating function based on the one or more assignments.

17. The method of claim 13 further comprises providing all satisfactory assignments of the abstracted function.

18. A method comprising:
obtaining a Boolean function;
constructing an abstracted function associated with the Boolean function, the abstracted function is defined over a non-Boolean domain;
adding a limitation on a number of inputs of the abstracted function which are assigned a Boolean value, said adding the limitation is performed using a processor, the limitation comprising:
defining a control variable associated with an input; and
defining a cardinality constraint over a value of one or more control variables;
wherein said adding the limitation on the number of inputs of the abstracted function is performed iteratively, in a first iteration a first cardinality constraint is defined and in a second iteration a second cardinality constraint is defined; and
whereby the Boolean function is transformed to the abstracted function, the abstracted function is configured to be satisfied by a partial assignment.

* * * * *